United States Patent
Reshadi et al.

(10) Patent No.: US 9,372,836 B2
(45) Date of Patent: Jun. 21, 2016

(54) HTML5 I-FRAME EXTENSION

(75) Inventors: Mohammad H. Reshadi, Sunnyvale, CA (US); Gheorghe C. Cascaval, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 13/451,981

(22) Filed: Apr. 20, 2012

(65) Prior Publication Data

US 2013/0262978 A1 Oct. 3, 2013

Related U.S. Application Data

(60) Provisional application No. 61/618,254, filed on Mar. 30, 2012.

(51) Int. Cl.
  *G06F 17/00* (2006.01)
  *G06F 17/22* (2006.01)
  *G06F 17/27* (2006.01)
  *G06F 17/30* (2006.01)
  *G06F 17/21* (2006.01)

(52) U.S. Cl.
  CPC .......... *G06F 17/2247* (2013.01); *G06F 17/218* (2013.01); *G06F 17/272* (2013.01); *G06F 17/30896* (2013.01); *G06F 17/30899* (2013.01)

(58) Field of Classification Search
  CPC .............. G06F 17/2247; G06F 17/218; G06F 17/30896
  USPC .......................................... 715/234, 237, 240
  See application file for complete search history.

(56) References Cited

U.S. PATENT DOCUMENTS

| 8,065,610 | B2 | 11/2011 | Xu et al. |
| 2004/0148571 | A1* | 7/2004 | Lue ................................ 715/514 |
| 2005/0091111 | A1* | 4/2005 | Green ................ G06Q 30/0262 705/14.59 |
| 2007/0299857 | A1* | 12/2007 | Gwozdz et al. ................ 707/102 |
| 2008/0133722 | A1 | 6/2008 | Ramasundaram et al. |
| 2008/0184102 | A1 | 7/2008 | Selig |
| 2008/0271046 | A1 | 10/2008 | Lipton et al. |
| 2009/0070190 | A1* | 3/2009 | Gorty ...................... G06Q 30/02 705/14.6 |
| 2009/0094514 | A1 | 4/2009 | Dargahi et al. |
| 2010/0269050 | A1 | 10/2010 | Kirkby et al. |
| 2010/0299205 | A1* | 11/2010 | Erdmann et al. ........... 705/14.54 |
| 2012/0054596 | A1* | 3/2012 | Kroger et al. .................. 715/234 |

OTHER PUBLICATIONS

W3C Working Draft, HTML5: Edition for Web Authors, 2011, W3C.org.*
Ian Hickson (ed.), "HTML5, A Vocabulary and Associated APIs for HTML and XHTML, " W2C Working Draft, Google, Inc., Jan. 6, 2012 <http://www.w3.org/TR/html15/the-iframe-element.html>.
International Search Report and Written Opinion—PCT/US2013/026861—ISA/EPO—Nov. 27, 2013.

* cited by examiner

*Primary Examiner* — Stephen Hong
*Assistant Examiner* — Matthew Ludwig

(57) ABSTRACT

The various aspects provide methods, servers, and systems for identifying independent portions of an HTML document so that the identified portions may be processed in parallel. The independent portions may be associated with an iframe tag having both the seamless and sandbox attributes. At runtime, a browser may detect the presence of both attributes, and process the contents of the iframe in parallel.

52 Claims, 7 Drawing Sheets

HTML5 I-FRAME EXTENSION

RELATED APPLICATIONS

This application claims the benefit of priority of U.S. Provisional Patent Application No. 61/618,254 entitled "HTML5 I-Frame Extension" filed Mar. 30, 2012, the entire contents of which are hereby incorporated by reference.

BACKGROUND

Mobile and wireless technologies have seen explosive growth over the past several years. This growth has been fueled by better communications, hardware, and more reliable protocols. Wireless service providers are now able to offer their customers an ever-expanding array of features and services, and provide users with unprecedented levels of access to information, resources, and communications. To keep pace with these enhancements, mobile devices (e.g., cellular phones, smartphones, tablet computers, etc.) have become more feature-rich than ever, and now commonly include web browsers and other internet-based software applications. As mobile devices continue to grow in popularity, improving the speed and power consumption characteristics of mobile web browsers is becoming ever more important.

SUMMARY

The various aspects include methods of processing content in a web browser of a computing device, which may include identifying independent portions of a web document, partitioning the document into a plurality of files (each independent portion being included in one file), associating a tag with the plurality of files (the tag having a first attribute and a second attribute), inserting a reference to the plurality of files and associated tags into the web document, and sending the web document to a browser application executing in a computing device. In an aspect, the methods may include receiving the web document in the browser application executing in the computing device, determining whether the tag within the web document includes both the first attribute and the second attribute, and processing the plurality of files associated with the tag in response to determining that the tag includes both the first and second attributes. In a further aspect, the method may include determining whether the first attribute is included in the tag before the second attribute in response to determining that the tag includes both the first and second attributes, and processing the plurality of files in parallel when the first attribute is included before the second attribute in the same tag. In a further aspect, the method may include determining whether the second attribute is included in the tag before the first attribute in response to determining that the tag includes both the first and second attributes, and processing the plurality of files sequentially when the second attribute is included before the first attribute in the same tag. In a further aspect, determining whether the tag within the web document includes both the first attribute and the second attribute may include determining whether an iframe tag includes both a sandbox attribute and a seamless attribute. In a further aspect, identifying independent portions of a web document may include identifying independent portions of a hypertext markup language (HTML) document. In a further aspect, identifying independent portions of a web document may include identifying independent portions of a web document that do not share state information. In a further aspect, identifying independent portions of a web document may be accomplished by an external tool. In a further aspect, identifying independent portions of a web document may be accomplished by a web server. In a further aspect, identifying independent portions of a web document may be accomplished by the browser application executing in the computing device before runtime of the web document.

Further aspects include a computing device having a processor configured with processor-executable instructions to perform operations including identifying independent portions of a web document, partitioning the document into a plurality of files (each independent portion being included in one file), associating a tag with the plurality of files (the tag having a first attribute and a second attribute), inserting a reference to the plurality of files and associated tags into the web document, and sending the web document to a browser application executing in a computing device. In a further aspect, the processor may be configured with processor-executable instructions to perform operations further including identifying independent portions of a web document includes identifying independent portions of a hypertext markup language (HTML) document. In a further aspect, the processor may be configured with processor-executable instructions to perform operations further including identifying independent portions of a web document includes identifying independent portions of a web document that do not share state information. In a further aspect, the processor may be configured with processor-executable instructions to perform operations further including identifying independent portions of a web document is accomplished by an external tool. In a further aspect, the computing device may be a web server. In a further aspect, the processor may be configured with processor-executable instructions such that associating a tag with the plurality of files includes associating an iframe tag that includes both a sandbox attribute and a seamless attribute with the plurality of files.

Further aspects include a computing device having a processor configured with processor-executable instructions to perform operations including receiving the web document in the browser application executing in the computing device, determining whether the tag within the web document includes both the first attribute and the second attribute, and processing the plurality of files associated with the tag in response to determining that the tag includes both the first and second attributes. In a further aspect, the processor may be configured with processor-executable instructions to perform operations further including determining whether the first attribute is included in the tag before the second attribute in response to determining that the tag includes both the first and second attributes, and processing the plurality of files in parallel when the first attribute is included before the second attribute in the same tag. In a further aspect, the processor may be configured with processor-executable instructions to perform operations further including determining whether the second attribute is included in the tag before the first attribute in response to determining that the tag includes both the first and second attributes, and processing the plurality of files sequentially when the second attribute is included before the first attribute in the same tag. In a further aspect, the processor may be configured with processor-executable instructions to perform operations further including determining whether the tag within the web document includes both the first attribute and the second attribute includes determining whether an iframe tag includes both a sandbox attribute and a seamless attribute. In a further aspect, the processor may be configured with processor-executable instructions to perform operations further including identifying independent portions of a web document is accomplished by the browser application before runtime.

Further aspects include a computing device having means for identifying independent portions of a web document, means for partitioning the document into a plurality of files, means for associating a tag with the plurality of files, means for inserting a reference to the plurality of files and associated tags into the web document, and means for sending the web document to a browser application executing in a computing device. In an aspect, the means for identifying independent portions of a web document may include means for identifying independent portions of a hypertext markup language (HTML) document. In an aspect, the means for identifying independent portions of a web document may include means for identifying independent portions of a web document that do not share state information. In an aspect, the means for identifying independent portions of a web document may include means for identifying independent portions of a web document via an external tool. In a further aspect, means for identifying independent portions of a web document may be a web server. In a further aspect, the means for associating a tag with the plurality of files may include means for associating an iframe tag that includes both a sandbox attribute and a seamless attribute with the plurality of files Further aspects include a computing device having means for receiving the web document in the browser application executing in the computing device, means for determining whether the tag within the web document includes both the first attribute and the second attribute, and means for processing the plurality of files associated with the tag in response to determining that the tag includes both the first and second attributes. In an aspect, the computing device may include means for determining whether the first attribute is included in the tag before the second attribute in response to determining that the tag includes both the first and second attributes, and means for processing the plurality of files in parallel when the first attribute is included before the second attribute in the same tag. In an aspect, the computing device may include means for determining whether the second attribute is included in the tag before the first attribute in response to determining that the tag includes both the first and second attributes, and means for processing the plurality of files sequentially when the second attribute is included before the first attribute in the same tag. In an aspect, the means for determining whether the tag within the web document includes both the first attribute and the second attribute may include means for determining whether an iframe tag includes both a sandbox attribute and a seamless attribute. In a further aspect, means for identifying independent portions of a web document may include means for identifying independent portions via a browser application before runtime.

Further aspects include a non-transitory server-readable storage medium having stored thereon processor-executable instructions configured cause a computing device to perform operations including identifying independent portions of a web document, partitioning the document into a plurality of files, associating a tag with the plurality of files, inserting a reference to the plurality of files and associated tags into the web document, and sending the web document to a browser application executing in a computing device. In a further aspect, the stored processor-executable software instructions may be configured to cause a processor to perform operations such that identifying independent portions of a web document includes identifying independent portions of a web document that do not share state information. In a further aspect, the stored processor-executable software instructions may be configured to cause a processor to perform operations such that identifying independent portions of a web document is accomplished by an external tool. In a further aspect, the stored processor-executable software instructions may be configured to be executed on a web server. In a further aspect, the stored processor-executable software instructions may be configured to cause a processor to perform operations such that associating a tag with the plurality of files includes associating an iframe tag that includes both a sandbox attribute and a seamless attribute with the plurality of files Further aspects include a non-transitory server-readable storage medium having stored thereon processor-executable instructions configured cause a computing device to perform operations including receiving the web document in the browser application executing in the computing device, determining whether the tag within the web document includes both the first attribute and the second attribute, and processing the plurality of files associated with the tag in response to determining that the tag includes both the first and second attributes. In a further aspect, the stored processor-executable software instructions may be configured to cause a processor to perform operations for determining whether the first attribute is included in the tag before the second attribute in response to determining that the tag includes both the first and second attributes, and processing the plurality of files in parallel when the first attribute is included before the second attribute in the same tag. In a further aspect, the stored processor-executable software instructions may be configured to cause a processor to perform operations for receiving the web document in the browser application executing in the computing device, determining whether the second attribute is included in the tag before the first attribute in response to determining that the tag includes both the first and second attributes, and processing the plurality of files sequentially when the second attribute is included before the first attribute in the same tag. In a further aspect, the stored processor-executable software instructions may be configured to cause a processor to perform operations such that determining whether the tag within the web document includes both the first attribute and the second attribute includes determining whether an iframe tag includes both a sandbox attribute and a seamless attribute. In a further aspect, the stored processor-executable software instructions may be configured to cause a processor to perform operations such that identifying independent portions of a web document includes identifying independent portions of a hypertext markup language (HTML) document. In a further aspect, the stored processor-executable software instructions may be configured to cause a processor to perform operations such that identifying independent portions of a web document is accomplished by the browser application before runtime, i.e., before rendering of the web document.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
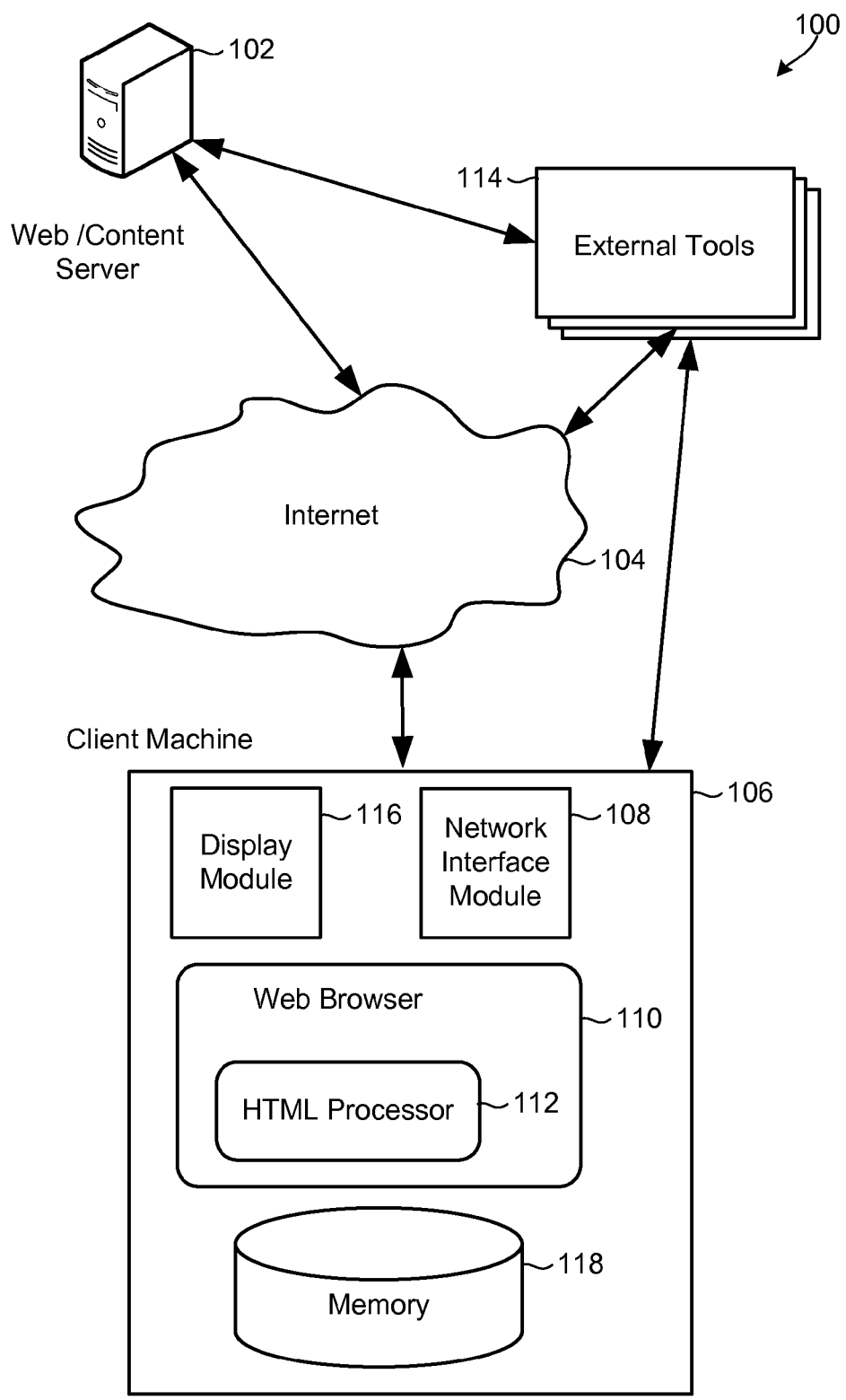
FIG. 1 is a component block diagram illustrating logical components and flows in an example network suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "code" and "scripts" are used generically and interchangeably herein, and encompass data and content that may be used or rendered by an application. It should also be understood that the various aspects disclosed herein may be applicable to any part of an application (e.g., browser), including both code and content.

The term "computing device" is used generically herein to refer to any one or all of servers, personal computers, mobile devices, cellular telephones, personal data assistants (PDA's), smartphones, Global Positioning System (GPS) receivers, wireless gaming controllers, and similar personal electronic devices which include a programmable processor configured with a web browser type application. While the various aspects are particularly useful in mobile devices, such as cellular telephones, which have limited processing power, the aspects are generally useful in any computing device that executes scripts and applications written in scripting languages.

The term "resource" is used herein to refer to any of a wide variety of circuits (e.g., ports, clocks, buses, oscillators, etc.), components (e.g., memory), signals (e.g., clock signals), and voltages (e.g., voltage rails) which are used to support processors and clients running on a computing device.

The term "queue" is used generically in this application to refer to a linear data structure containing an ordered collection of objects. The principal operations on the queue are the addition of entities to the rear terminal position and removal of entities from the front terminal position. Queues are generally First-In-First-Out (FIFO) data structures, in which the first element added to the queue will be the first one to be removed. Queues, as used herein, may be implemented using circular buffers, linked lists, and/or pointer arrays. A linked list is a data structure that includes a sequence of objects containing a reference link to the next record in the sequence. Linked lists allow objects to be inserted and/or removed at any position in the list by modifying the reference links of one or more individual objects. Thus, the order of the linked items may be different from the order that the data items are stored in memory or on disk.

Hypertext markup language (HTML) is a popular standards-based a markup language that implements the ISO/IEC 15445 standard. HTML may be characterized as a set of markup tags (e.g., annotations) used to describe web pages such that they can be displayed by a software application, such as a web browser. HTML allows for the creation of structured documents by denoting structural semantics for text, such as headings, paragraphs, lists, links, quotes, and other items. HTML is used by many web browsers to interpret and compose content (e.g., text, images, etc.) into visual or audible web pages (referred to herein sometimes as a "web document").

HTML can embed JavaScript® code capable of affecting the behavior and/or presentation of the containing HTML page. The embedded JavaScript® code may also generate additional HTML code, which can be inserted into the containing HTML page (the HTML code in which the JavaScript® is embedded). JavaScript® may be used to embed functions into HTML code such that the functions interact with, and manipulate, the document object model (DOM) of the HTML page. DOM is a language-independent convention for representing and interacting with objects in HTML, and allows the JavaScript® code to have access to, and manipulate, the containing HTML page.

Various aspects are described herein using HTML and related terminology as convenient examples of a programming/markup language that may be used for implementing the various aspects. However, it should be understood that the examples and other references related to HTML are for illustration purposes only, and are not intended to limit the descriptions or the aspects to any particular programming language. Therefore the scope of the claims should not be construed as requiring HTML unless specifically recited in the claims.

As mentioned above, mobile devices are growing in popularity and mobile device users are spending an increasing amount of time consuming media from over Internet. As also mentioned above, improving the speed and power consumption characteristics of mobile web browsers are important design goals for manufactures of mobile devices. The various aspects provide improved browser methods for processing a webpage in parallel so as to improve rendering speeds without significantly impacting the power consumption characteristics of computing device.

Generally, the amount of time required to execute a software application is proportional to the number of instructions that must be performed multiplied by the average time required to perform each instruction. Increasing a processor's clock frequency (i.e., clock rate) reduces the average time required to perform each instruction, improving the overall execution time. However, increasing the clock frequency also increases the amount of power consumed by the mobile device, which can lead to decreased battery life. In resource constrained environments that are typical in mobile devices in which battery life and power consumption characteristics are important considerations, simply increasing the clock frequency may not improve the user experience, because the negative impact on battery life may outweigh the improvements in processing speeds.

Parallel processing is a processing technique in which larger processes are divided into smaller tasks and performed concurrently (i.e., in parallel) by multiple processors or processor cores. An efficient parallel processing scheme improves execution time without significantly impacting power consumption or battery life. Due to the increasing amount of time mobile device users spend consuming media from over Internet, implementing a web browser capable efficiently processing a webpage in parallel has become an important design goal for manufacturers of mobile devices.

Concurrent processing of a webpage requires performing a dependency analysis for all elements in the page. This analysis is generally too expensive (e.g., in terms of time, energy, resources, etc.) to be performed at run time, as the costs of performing such operations at runtime often negate the benefits of parallel processing. To overcome this limitation, dependencies may be specified statically (e.g., in advance of runtime) and encoded into the webpage. At runtime, a browser application may use the encoded information to identify independent portions of the webpage, and process identified portions in parallel.

Statically specifying the dependencies requires either that the browser spend time and energy detecting and identifying the independent portions of the page rendering operations, or that the software developer manually identify and encode such information in the webpage. Using existing solutions, manually encoding such information requires that the developer add proprietary HTML tags to the webpage that are not defined by the HTML standard.

The various aspects overcome the disadvantages of other solutions for parallel processing of HTML web documents by providing improved methods for identifying independent portions of HTML documents without consuming excess amounts of time or energy at run time and without requiring developers to manually encode proprietary HTML tags into the webpage.

As mentioned above, HTML is a popular standards-based markup language used by web browsers to interpret and compose content (e.g., text, images, etc.). HTML supports the use of frames (e.g., <frame>, <iframe>, etc.) that enable web browsers to display one or more web pages or media elements within the same browser window. Specifically, HTML frames allow a visual browser window to be split into two or more segments so that each segment may display a different document (e.g., web pages, media elements, etc.). An "inline frame" or "iframe" is a specific type of HTML frame that enables two or more documents (herein "imbedded document) to be visually embedded in another document (herein "main document") and displayed on the same page.

While the general properties of the HTML frames and iframes are defined by the HTML specifications, the HTML specifications do not provide any guidance on how visual and data interactions are to be accomplished between a main document and the imbedded documents in the presence of iframes. Existing browser solutions may use proprietary HTML tags to define these interactions. However, such proprietary tags are not supported by the HTML standards and differ between browser implementations, thereby reducing the portability and backwards compatibility of the code.

HTML5 is the fifth revision of the HTML standard and aims to improve the HTML's support for multimedia applications while maintaining backward compatibility with existing systems (e.g., existing web browsers, parsers, etc.). The HTML5 specification introduces two new attributes for iframes that aim to clarify and standardize the iframe interactions: the "sandbox" attribute and the "seamless" attribute. The "sandbox" attribute instructs the browser to "sandbox" the iframe by disallowing/disabling various features. The "seamless" attribute instructs the browser that the iframe element's browsing context is to be rendered in a manner that makes it appear to be part of the containing document (i.e., seamlessly included in the main document). These two iframe attributes (e.g., seamless and sandbox) are generally understood as being incompatible and mutually exclusive, and the HTML5 specification does not define the behavior that is to be performed if both attributes are specified in the same iframe tag. Thus, existing browser solutions only support the performance of operations associated with one attribute at a time. For example, if both attributes are included in the same iframe, existing solutions may only perform operations associated with the first encountered tag.

The various aspects provide methods of implementing behaviors that support parallel processing when both the "seamless" and "sandbox" attributes are included in the same iframe tag, thereby defining a new (i.e., third) operation that is performed when both tags are present. Various aspects improve the performance of HTML page loads and rendering times by identifying independent portions of HTML documents that do not share state information (required for parallel processing) using a combination of the "sandbox" and "seamless" attributes. Various aspects identify independent portions of HTML documents without consuming excess amounts of time or energy, and without requiring the manual encoding of proprietary HTML tags.

As discussed above, concurrent processing of an HTML page requires performing a dependency analysis for all elements in the document, which is generally too expensive to be performed at runtime. These dependencies may be specified statically ahead of time and encoded into the webpage so that the browser may identify the independent portions that may be performed in parallel. However, since the HTML standards do not define tags for detecting these independent portions, existing browser solutions require that a browser spend time and energy identifying the independent portions. The various aspects enable developers, offline tools, and/or servers to identify with tags the independent pieces of a document outside of the browser (e.g., before runtime), thereby reducing the time and energy required for the browser to identify the independent portions.

The independent portions of an HTML document may be identified outside the browser in a number of different ways. For example, the application developer may manually identify the independent portions, an offline static tool may analyze the page and to identify the independent portions, or a web server may perform the analysis to identify the independent portions. Once the independent portions are identified, the document may be partitioned into several files. These files may be tagged with two iframe attributes (e.g., seamless and sandbox) and incorporated back into the original HTML document. For example, the files may be incorporated back into the original HTML document using an <iframe> tag with both "seamless" and "sandbox" attributes (e.g., <iframe seamless sandbox src=" . . . "/>, etc.) present.

In an aspect, the order in which the attributes are present in the iframe tag may identify the operations that are to be performed. For example, a browser may be configured to interpret the inclusion of the sandbox attribute before the seamless attribute in an iframe to mean that the content of the iframe is independent of the rest of the document and may be processed in any order (e.g., in parallel with other processes). Likewise, the browser may be configured to interpret the inclusion of the seamless attribute before the sandbox attribute in the iframe to mean that the content of the iframe should be processed in order and/or within the context of the containing document. In this manner, the various aspects enable the independent portions to be readily identified to the browser for more efficient parallel processing of the HTML page, while remaining backwardly compatible with existing browsers. That is, since the HTML 5 specification does not define what should happen when both the seamless and sandbox attributes are present in the same iframe, including both attributes in HTML code will not cause most existing browser solutions to fail, as they will simply process the document as they normally would (e.g., ignoring the second attribute).

FIG. 1 illustrates an example network 100 that may be used for parallel processing of HTML pages in accordance with the various aspects. The network 100 may include a web/content server 102 that delivers content to a client machine 106 via the Internet 104, and offline/external tools 114 configured to perform browser operations in advance of runtime. The client machine 106 may include a network interface module 108, a display module 116, a memory 118 and a web browser 110. The browser 110 may include a HTML processor 112 for processing, interpreting and/or rendering HTML content. The external/offline tool 114 may be implemented anywhere in the network 100, such as on a web server (e.g., web server 102), as separate server, a proxy, or on the client machine 106. The external/offline tool 114 may be implemented as an independent process or as a part of the browser 110.

In an aspect, the browser 110 may be configured to offload certain browser operations to the offline/external tools 114, such that the offloaded operations are separated from the other operations in time and/or space (i.e., performed ahead of time, by a different machine). In an aspect, the browser 110 may be configured to offload operations associated with analyzing and tagging the HTML code to the external/offline tool 114. In an aspect, the external/offline tool 114 may be part of browser 110 and include a preprocessor that pre-processes HTML code when the client machine 106 detects that it is connected to a power source and/or is idle.

The external tool 114 and/or the web server 102 may be configured to analyze HTML code to identify the independent portions of an HTML document and tag the identified portions with the iframe attributes (e.g., seamless and sandbox). For example, in an aspect, the web/content server 102 may tag and send the HTML code to the web browser 110 for rendering. In another aspect, the external/offline tool 114 may tag and send the HTML code to the web browser 110 rendering. In an aspect, the tagged HTML code may be stored in memory for later use.

The browser 110 may be configured to detect the presence of both the "sandbox" and "seamless" attributes in a single iframe to identify the operations that are to be performed. In an aspect, the browser 110 may be configured to detect the order in which the attributes are present in the iframe tag to further identify the operations that are to be performed. For example, if it is detected that the sandbox attribute is included in the iframe tag before the seamless attribute, the browser may process the contents of the iframe in parallel and/or with other content. Likewise, if the browser detects that the seamless attribute is included first, the browser may process the contents of the iframe sequentially.

In an aspect, the tags may be embedded in the HTML code so that they do not impact existing browser solutions. For example, the tags may be embedded such that they may be processed by browsers modified to understand the significance of the presence of both attributes in the same tag, and ignored by unmodified browsers.

Figure 2:
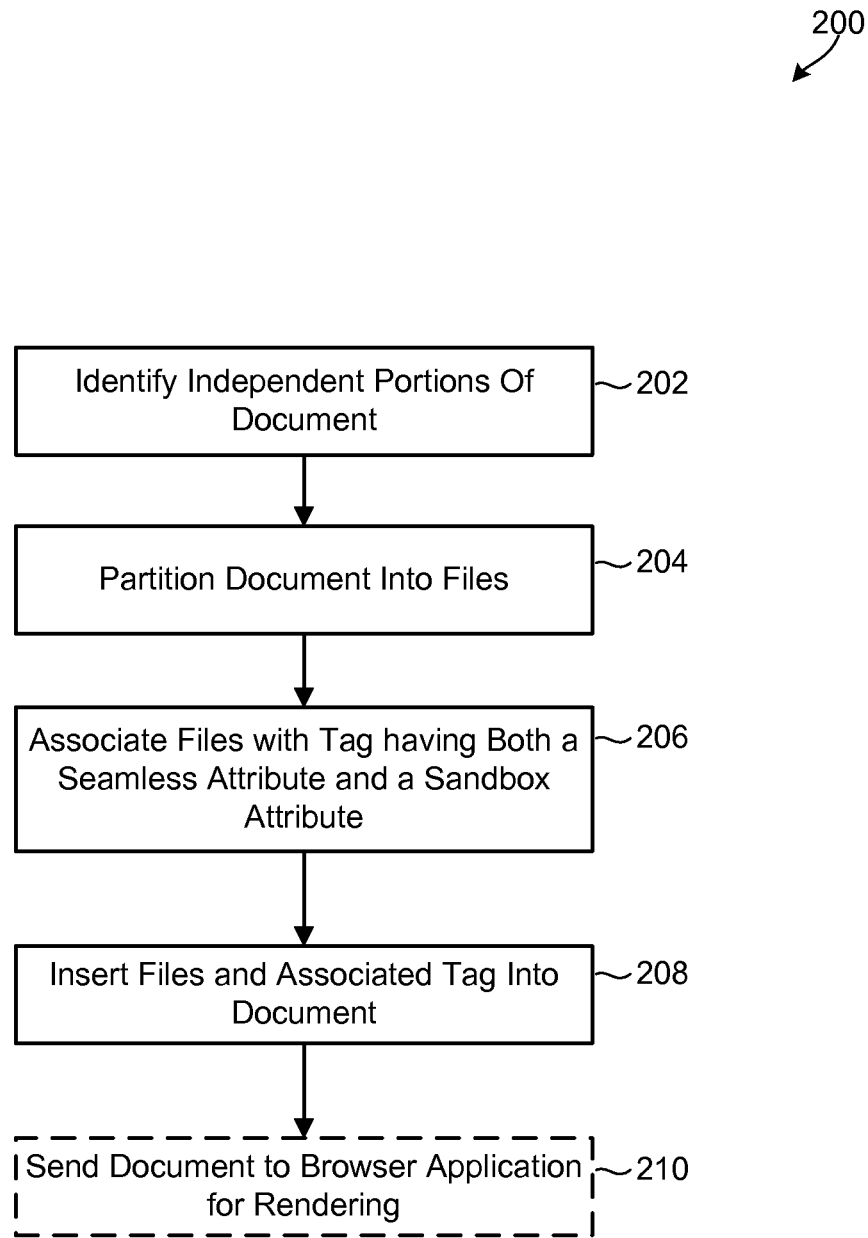
FIG. 2 is process flow diagram of an aspect method for identifying and tagging the independent portions of an HTML web document.

FIG. 2 illustrates an aspect method 200 of identifying and tagging independent portions of an HTML document. In block 202, the independent portions of an HTML document may be identified. This may accomplished, for example, by analyzing the HTML document to identify code sections marked as independent by a software developer, or by analyzing the HTML document (e.g., in the browser, an external tool, web server, etc.) to identify portions that are not dependent on the processing results generated by other portions of the HTML document. In block 204, the HTML document may be partitioned into a plurality of files. For example, each independent portion may be included in one file and all the dependent portions may be included in another file. In block 206, the files may be associated with an iframe tag having both the seamless and sandbox attributes. This may be accomplished, for example, by including the files in the content portion of the iframe tag. In an aspect, the files containing the independent portions may be associated with a first iframe tag, and the files containing the dependent portions may be associated with a second iframe tag. In an aspect, iframe tags associated with the independent portions may be generated to include the seamless attribute before the sandbox attribute, whereas iframe tags associated with dependent portions may be generated to include sandbox attribute before the seamless attribute. In block 208, the files and the associated tags may be inserted back into the HTML document. In optional block 210, the HTML document may be sent to a browser application for rendering.

Figure 3:
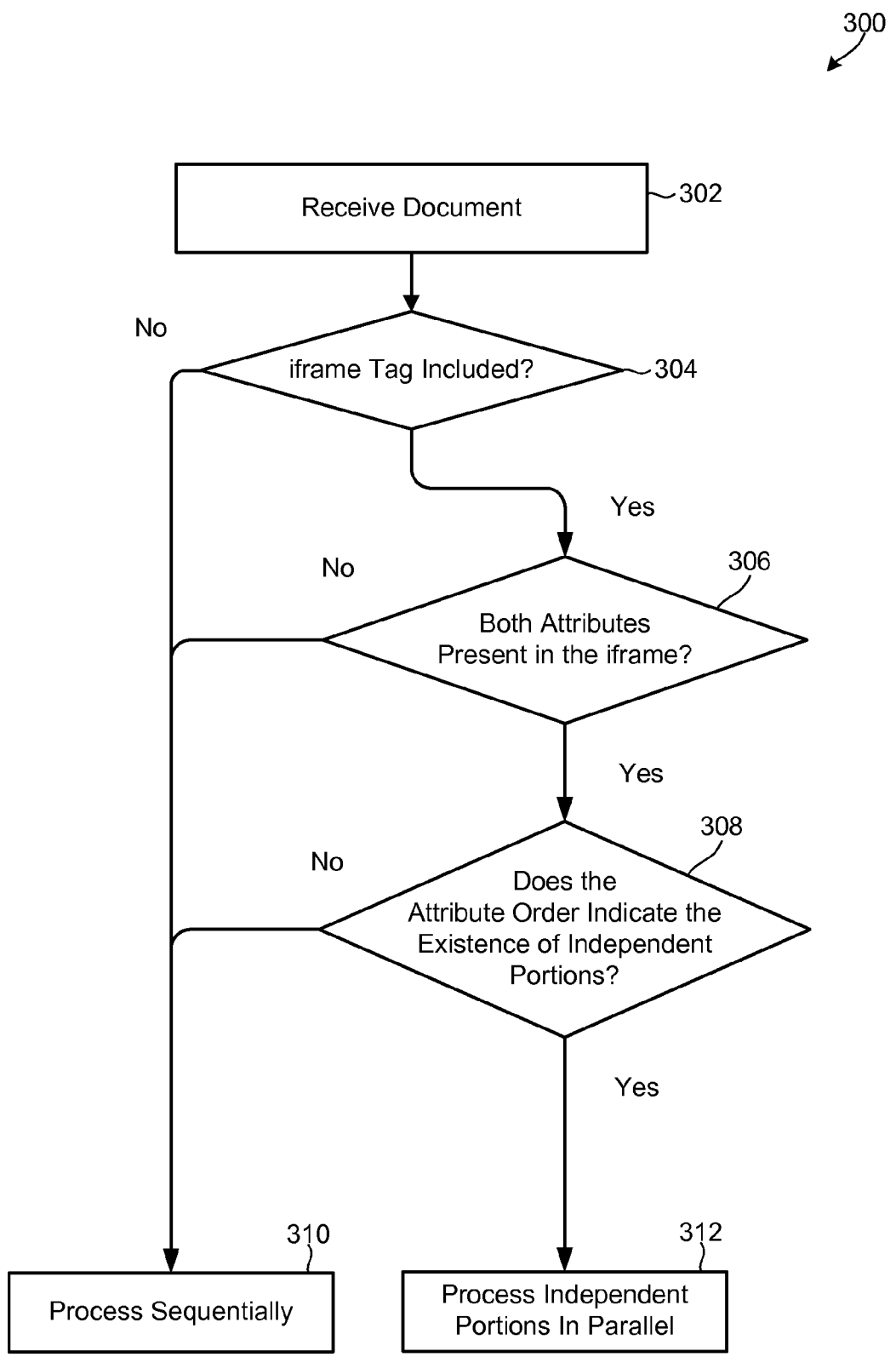
FIG. 3 is a process flow diagram of an aspect method for processing independent portions of an HTML web document in parallel.

FIG. 3 illustrates an aspect browser method 300 of processing a HTML document in parallel. In block 302, the browser may receive an HTML document for rendering. In determination block 304, the browser may determine whether the HTML document includes an iframe tag. If the browser determines that the HTML document does not include an iframe tag (i.e., determination block 304="No"), the browser may process the web page content using conventional methods in block 310 (e.g., sequentially). If the browser determines that the HTML document does include an iframe tag (i.e., determination block 304="Yes"), in determination block 306 the browser may determine whether the iframe tag includes both the seamless and sandbox attributes. If the browser determines that the iframe tag does not include both the seamless and sandbox attributes (i.e., determination block 306="No"), the browser may process the web page content using conventional methods in block 310. If the browser determines that the iframe tag does include both the seamless and sandbox attributes (i.e., determination block 306="Yes"), the browser may determine if the order in which the attributes are included in the tag identifies the contents of the tags as being independent portions of the HTML document in determination block 308. For example, the browser may be configured to interpret the inclusion of the sandbox attribute before the seamless attribute in an iframe as identifying that the content of the iframe is independent of the rest of the document and may be processed in any order (e.g., in parallel with other processes), or vice versa.

If the browser determines that the attribute order does not identify the contents of the tags as being independent portions of the HTML document (i.e., determination block 308="No"), the browser may process the contents of the iframe sequentially in block 310. On the other hand, if the browser determines that the attribute order identifies the contents of the tags as being independent portions of the HTML document (i.e., determination block 308="Yes"), the browser may processes the independent portions in parallel in block 312.

In an aspect, the operations of method 300 may be combined with those of method 200 by, for example, the web browser identifying and tagging the independent portions of the HTML document in advance of runtime and storing the tagged content in a memory for later processing.

Figure 4:
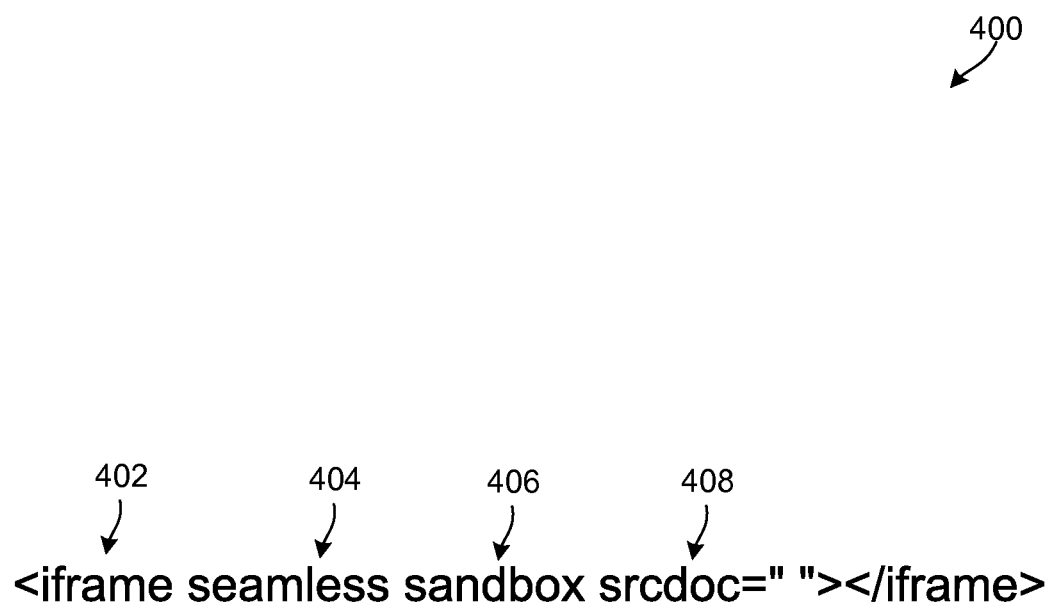
FIG. 4 is an illustration of an example HTML tag suitable for use with the various aspects.

FIG. 4 illustrates an example HTML tag 400 that may be used by the various aspects for identifying independent portions of HTML documents without consuming excess amounts of time or energy at run time and without requiring developers to manually encode proprietary HTML tags into the webpage. In the example illustrated in FIG. 4, the HTML tag includes an iframe tag identifier 402, a seamless attribute 404, a sandbox attribute 406, and a srcdoc attribute 408. The srcdoc attribute 408 specifies content that the nested browsing context is to contain (i.e., source of an iframe srcdoc document). The presence of both the "seamless" and "sandbox" attributes in the same iframe tag allows for performing a new (i.e., third) operation that is not specified by the HTML standards and/or identifies independent portions of an HTML page so they may be readily identified by a browser.

As discussed above, concurrent processing of an HTML page requires performing a dependency analysis for all elements in the document, which is generally too expensive to be performed at runtime. These dependencies may be specified statically ahead of time and encoded into the webpage so that the browser may identify the independent portions that may be performed in parallel. However, since the HTML standards do not define tags for detecting these independent portions, existing browser solutions require that a browser spend time and energy identifying the independent portions.

One of the benefits provided by the various aspects is embedding tags in the independent portions of an HTML page so they may be readily identified by a browser (e.g., for more efficient parallel processing) while maintaining backward compatibility with existing browsers. That is, since the various aspect do not require proprietary tags, and the HTML 5 specification does not define what should happen when both the seamless and sandbox attributes are present in the same iframe, including both attributes in HTML code is backward compatible with existing solutions because they will simply process the document conventionally (e.g., by ignoring the second attribute).

Various aspects implement HTML 5 standards. Generally, HTML 5 is the fifth revision of the HTML standard, and aims to improve the HTML language with support for the latest multimedia while keeping the language easily readable by humans and consistently understood by computers and devices (web browsers, parsers, etc.). HTML 5 is intended to subsume not only HTML 4, but XHTML 1 and DOM Level 2 HTML as well. The HTML 5 standard was developed in a response to the observation that the HTML and XHTML in common use on the world wide web are a mixture of features introduced by various specifications, along with those introduced by software products such as web browsers, those established by common practice, and the many syntax errors in existing web documents. It is also an attempt to define a single markup language that can be written in either HTML or XHTML syntax. It includes detailed processing models to encourage more interoperable implementations, as it extends, improves and rationalizes the markup available for documents and introduces markup and application programming interfaces (APIs) for complex web applications. For the same reasons, HTML5 is also a potential candidate for cross-platform mobile applications. The various aspects utilize these and other features of HTML 5 to implement web-based software applications that run on low-powered devices, such as smartphones and tablets.

In various aspects, JavaScript® code may be embedded in HTML code, and at the same time, generate additional HTML code to be inserted into the containing HTML page. To enable this, the HTML code (including HTML code generated by execution of JavaScript® code) may be parsed in sequential (i.e., serial) order so as to avoid repeatedly evaluating and/or processing the same information. To ensure proper order, browsers typically require at least two different mechanisms, or processes, to interpret, parse, and execute the JavaScript® code and the containing HTML code. For example, to interpret and display an HTML web page having JavaScript® code embedded therein, web browsers must typically run an HTML parser that separates the HTML markup tags from the substantive content and a JavaScript® execution engine that parses and executes the embedded scripts. The HTML parser typically runs until it encounters a JavaScript® tag, at which point it suspends its operations until the JavaScript® tag is processed. While the HTML parser is suspended, a JavaScript® engine is evoked to process the contents of the script (i.e. script text) associated with encountered tag. When the JavaScript® engine finishes executing the script text, it returns control back to the HTML parser, which restarts parsing the HTML code. This process is specified by standards (e.g., ECMAScript, ISO/IEC 16262) and ensures that the HTML code generated by execution of JavaScript® text is parsed in the proper (i.e., serial) order.

In executing the markup language code in a processor, the various aspects provide for receiving a request to load a web page as well as markup language code (including embedded scripting language code) associated with the requested web page. The received markup language code may be parsed to generate parse data. Segments of the embedded scripting language code may be packaged along with parsing state information into an execution state package. The execution state package may be stored in a scripting language script queue while the parsing the received markup language code is resumed. The execution state package may include scripting language code, parsing state information, execution contexts, memory locations, and identifiers of locations or points of interest in the markup language code, as well as other elements relevant to capturing, storing, and retrieving the state of execution at the time the script tag was encountered by the HTML parser.

Figure 5:
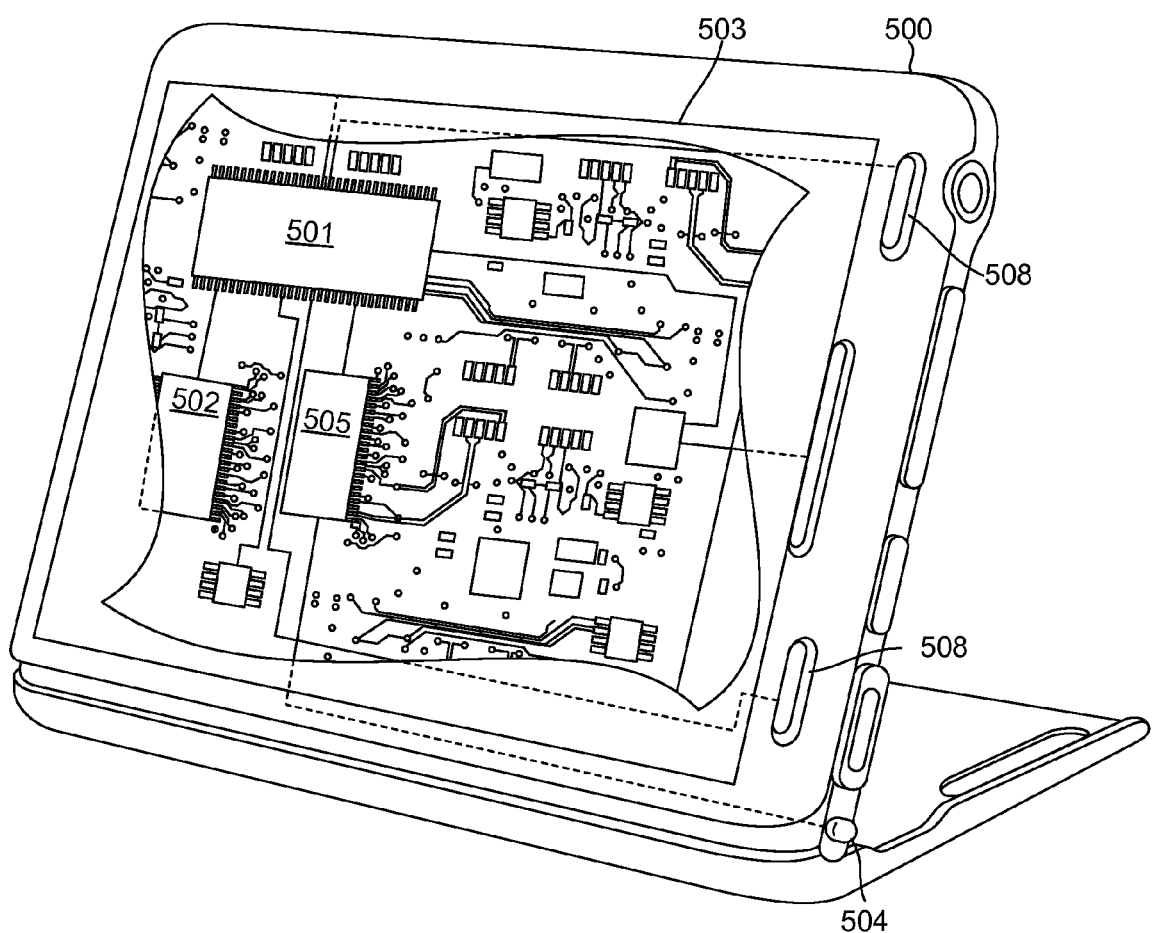
FIG. 5 is an illustration of an example mobile device suitable for use with the various aspects.
Figure 6:
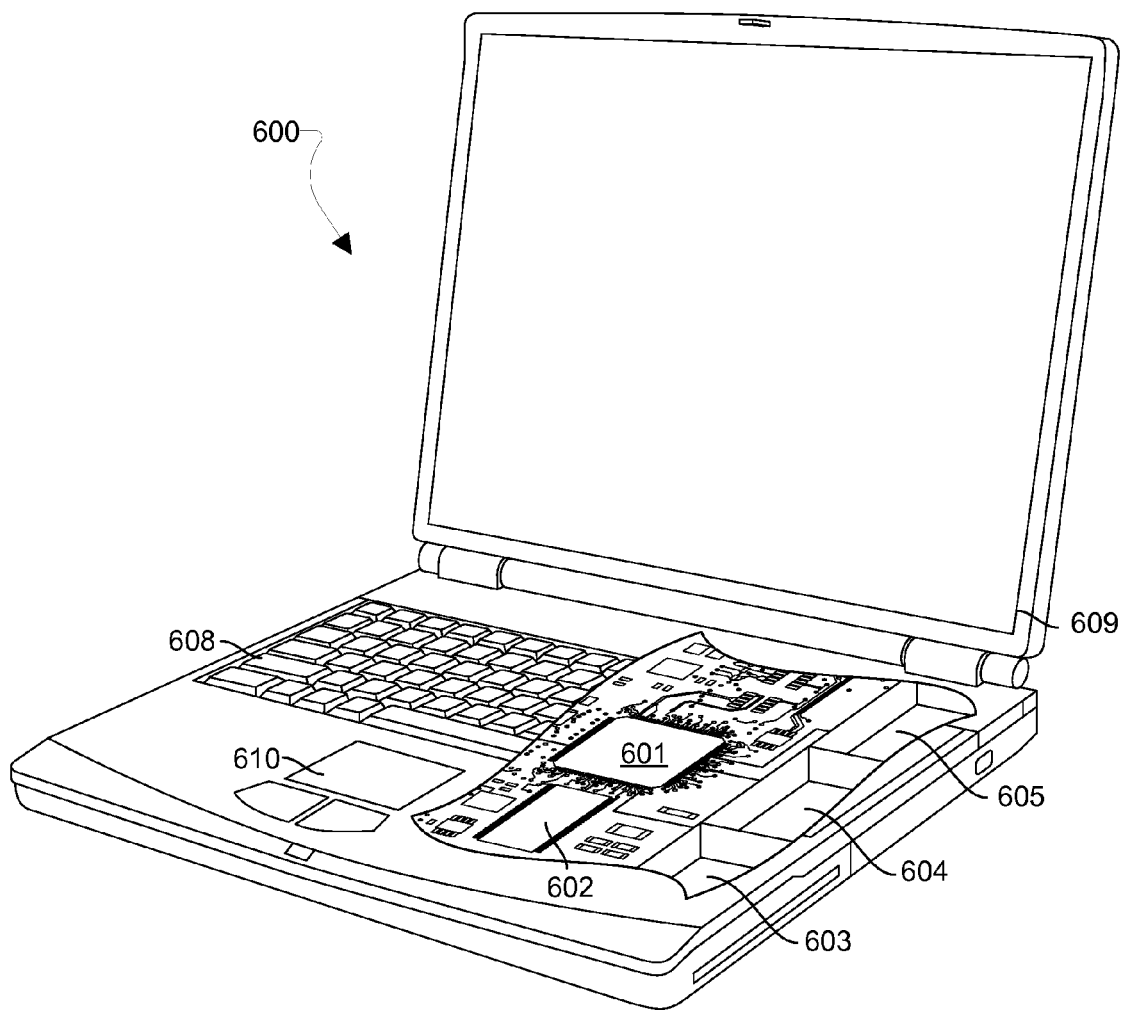
FIG. 6 is an illustration of an example personal computer suitable for use with the various aspects.

The various aspects may be implemented on any of a variety of computing devices. An example of a mobile computing device is illustrated in FIG. 5, and an example of a notebook computer is illustrated in FIG. 6. Typical mobile computing devices 500 will have in common the components illustrated in FIG. 5. For example, mobile computing devices 500 may include a processor 501 coupled to internal memory 502 and a touch surface input device/display 503. The touchscreen display 503, such as a resistive sensing touchscreen, capacitive sensing touchscreen, infrared sensing touchscreen, acoustic/piezoelectric sensing touchscreen, or the like. The various aspects are not limited to any particular type of touchscreen display 503 or touchpad technology. Additionally, the computing device 500 may have an antenna 504 for sending and receiving electromagnetic radiation that is connected to a wireless data link and/or cellular telephone transceiver 505 coupled to the processor 501. Computing devices 500 may also include physical buttons 508 for receiving user inputs.

While the various aspects may provide significant performance enhancements for mobile computing devices, other forms of computing devices, including personal computers and laptop computers, may also benefit from pre-parsing of the dynamic language scripts. Such computing devices typically include the components illustrated in FIG. 6, which illustrates an example personal laptop computer 600. Such a personal computer 600 generally includes a processor 601 coupled to volatile memory 602 and a large capacity nonvolatile memory, such as a disk drive 603. The computer 600 may also include a compact disc (CD) and/or DVD drive 604 coupled to the processor 601. The computer device 600 may also include a number of connector ports coupled to the processor 601 for establishing data connections or receiving external memory devices, such as a network connection circuit 605 for coupling the processor 601 to a network. The computer 600 may further be coupled to a keyboard 608, a pointing device such as a mouse 610, and a display 609 as is well known in the computer arts.

Figure 7:
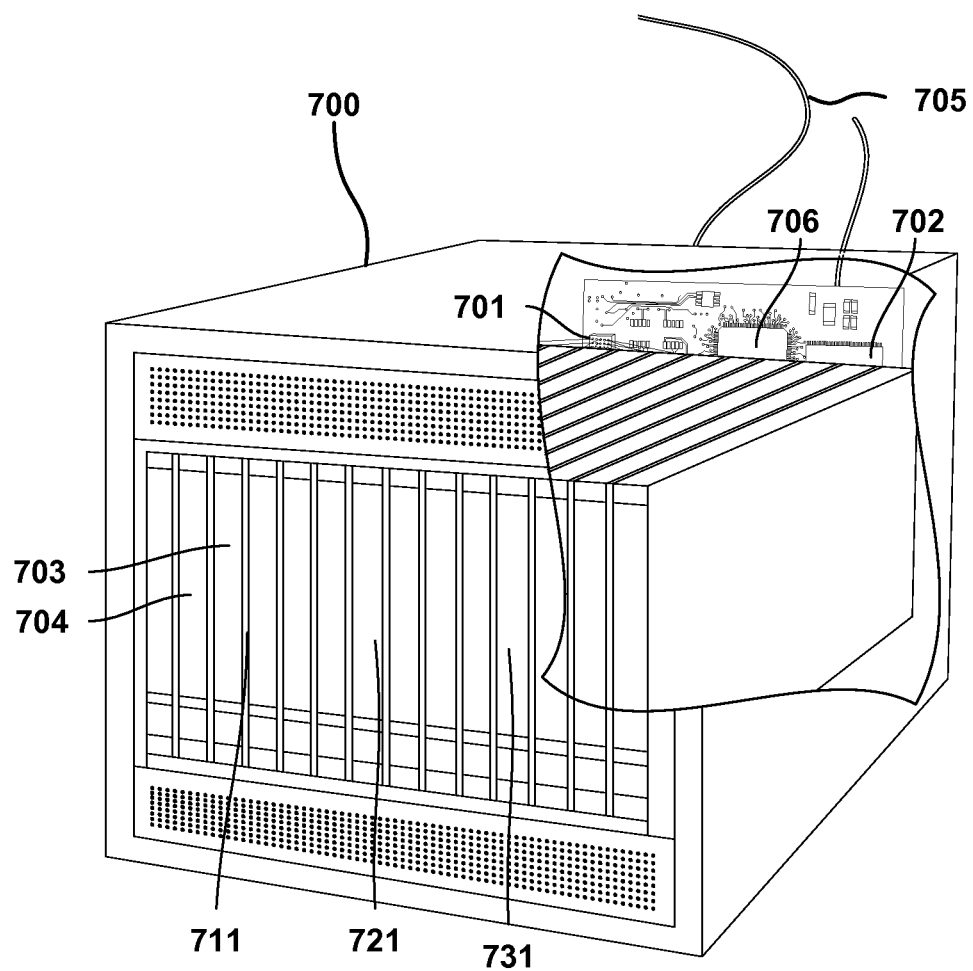
FIG. 7 is an illustration of an example server suitable for use with the various aspects.

The various aspects may also be implemented on any of a variety of commercially available server devices, such as the server 700 illustrated in FIG. 7. Such a server 700 typically includes a processor 701, and may include multiple processor systems 711, 721, 731, one or more of which may be or include multi-core processors. The processor 701 may be coupled to volatile memory 702 and a large capacity nonvolatile memory, such as a disk drive 703. The server 700 may also include a floppy disc drive, compact disc (CD) or DVD disc drive 706 coupled to the processor 701. The server 700 may also include a network access port or transceiver 704 coupled to the processor 701 for establishing data connections with a network 705, such as a local area network coupled to other broadcast system computers and servers.

The processor 501, 601, 701 may be any programmable microprocessor, microcomputer or multiple processor chip or chips that may be configured by software instructions (applications) to perform a variety of functions, including the functions of the various aspects described herein. In some mobile devices, multiple processors 501, 601, 701 may be provided, such as one processor dedicated to wireless communication functions and one processor dedicated to running other applications. Typically, software applications may be stored in the internal memory 502, 602, 702 before they are accessed and loaded into the processor 501, 601, 701. In some mobile devices, the processor 501, 601, 701 may include internal memory sufficient to store the application software instructions. In some mobile devices, the secure memory may be in a separate memory chip coupled to the processor 501, 601, 701. The internal memory 502, 602, 702 may be a volatile or nonvolatile memory, such as flash memory, or a mixture of both. For the purposes of this description, a general reference to memory refers to all memory accessible by the processor 501, 601, 701, including internal memory 502, 602, 702, removable memory plugged into the mobile device, and memory within the processor 501, 601, 701 itself.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory computer-readable or processor-readable storage medium. The steps of a method or algorithm disclosed herein may be embodied in a processor-executable software module, which may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for processing content in a browser, comprising:

identifying independent portions and dependent portions of a web document;

partitioning the web document into a plurality of files so that each of the identified independent portions are included in a first file of the plurality of files and each of the identified dependent portions are included in a second file of the plurality of files;

associating a first tag with the first file, the first tag including both a sandbox attribute and a seamless attribute;

associating a second tag with the second file, the second tag including both the sandbox attribute and the seamless attribute, wherein the sandbox attribute and the seamless attribute are ordered in each tag of the first tag and the second tag to indicate whether the tag is associated with the first file containing the independent portions or the second file containing the dependent portions;

inserting the plurality of files and the associated tags into the web document; and sending the web document to a browser application executing in a computing device.

2. The method of claim 1, further comprising:

receiving the web document in the browser application executing in the computing device;

determining that the first tag within the web document includes both the sandbox attribute and the seamless attribute; and processing the first file associated with the first tag in response to determining that the first tag includes both the sandbox attribute and the seamless attribute.

3. The method of claim 2, wherein determining that the first tag within the web document includes both the sandbox attribute and the seamless attribute comprises determining that an iframe tag includes both the sandbox attribute and the seamless attribute.

4. The method of claim 1, further comprising:

determining that the sandbox attribute is included in the first tag before the seamless attribute; and processing the independent portions of the first file in parallel when the sandbox attribute is included before the seamless attribute in the first tag.

5. The method of claim 1, further comprising:

determining that the seamless attribute is included in the second tag before the sandbox attribute; and processing the dependent portions of the second file sequentially when the seamless attribute is included before the sandbox attribute in the second tag.

6. The method of claim 1, wherein identifying independent portions of a web document comprises identifying independent portions of a hypertext markup language (HTML) document.

7. The method of claim 1, wherein identifying independent portions of a web document comprises identifying independent portions of the web document that do not share state information.

8. The method of claim 1, wherein identifying independent portions of a web document is accomplished by an external tool.

9. The method of claim 1, wherein identifying independent portions of a web document is accomplished by a web server.

10. The method of claim 1, wherein identifying independent portions of a web document is accomplished by the browser application before runtime.

11. A computing device, comprising:

means for identifying independent portions and dependent portions of a web document;

means for partitioning the web document into a plurality of files so that each of the identified independent portions are included in a first file of the plurality of files and each of the identified dependent portions are included in a second file of the plurality of files;

means for associating a first tag with the first file, the first tag including both a sandbox attribute and a seamless attribute;

means for associating a second tag with the second file, the second tag including both the sandbox attribute and the seamless attribute, wherein the sandbox attribute and the seamless attribute are ordered in each tag of the first tag and the second tag to indicate whether the tag is associated with the first file containing the independent portions or the second file containing the dependent portions;

means for inserting the plurality of files and the associated tags into the web document; and means for sending the web document to a browser application executing in another computing device.

12. The computing device of claim 11, wherein means for identifying independent portions of a web document comprises means for identifying independent portions of a hypertext markup language (HTML) document.

13. The computing device of claim 11, wherein means for identifying independent portions of a web document comprises means for identifying independent portions of the web document that do not share state information.

14. The computing device of claim 11, wherein means for identifying independent portions of a web document comprises means for identifying independent portions of the web document using an external tool.

15. The computing device of claim 11, wherein means for identifying independent portions of a web document comprises means for identifying independent portions of the web document on a web server.

16. The computing device of claim 11, wherein means for associating the first tag with the first file comprises means for associating an iframe tag that includes both the sandbox attribute and the seamless attribute with the first file.

17. A computing device, comprising:

means for receiving a web document in a browser application executing in the computing device, the web document including a plurality of files, a first tag, and a second tag, wherein a first file of the plurality of files includes all independent portions of the web document and a second file of the plurality of files includes all dependent portions of the web document, and wherein the first tag is associated with the first file and the second tag is associated with the second file;

means for determining that the associated first tag in the web document and the associated second tag in the web document each includes both a sandbox attribute and a seamless attribute, wherein the sandbox attribute and the seamless attribute are ordered in each tag of the first tag and the second tag to indicate whether the tag is associated with the first file containing the independent portions or the second file containing the dependent portions; and means for processing the plurality of files associated with the tags in response to the determination.

18. The computing device of claim 17, further comprising:

means for determining that the sandbox attribute is included in the first tag before the seamless attribute in response to determining that the first tag includes both the sandbox and seamless attributes; and means for processing the independent portions of the first file in parallel when the sandbox attribute is included before the seamless attribute in the first tag.

19. The computing device of claim 17, further comprising:

means for determining that the seamless attribute is included in the second tag before the sandbox attribute in response to determining that the second tag includes both the sandbox attribute and the seamless attribute; and means for processing the dependent portions of the second file sequentially when the seamless attribute is included before the sandbox attribute in the second tag.

20. The computing device of claim 17, wherein means for determining that the first tag within the web document includes both the sandbox attribute and the seamless attribute comprises means for determining that an iframe tag includes both the sandbox attribute and the seamless attribute.

21. The computing device of claim 17, further comprising means for identifying independent portions of the web document before runtime.

22. A computing device, comprising:
a transceiver configured to send and receive communication signals;
a memory; and
a processor coupled to the transceiver and the memory, wherein the processor is configured with processor-executable instructions to perform operations comprising:
identifying independent portions and dependent portions of a web document;
partitioning the web document into a plurality of files so that each of the identified independent portions are included in a first file of the plurality of files and each of the identified dependent portions are included in a second file of the plurality of files;
associating a first tag with the first file, the first tag including both a sandbox attribute and a seamless attribute;
associating a second tag with the second file, the second tag including both the sandbox attribute and the seamless attribute, wherein the sandbox attribute and the seamless attribute are ordered in each tag of the first tag and the second tag to indicate whether the tag is associated with the first file containing the independent portions or the second file containing the dependent portions;
inserting the plurality of files and the associated tags into the web document; and
sending the web document to a browser application executing in a computing device.

23. The computing device of claim 22, wherein the processor is configured with processor-executable instructions such that identifying independent portions of a web document comprises identifying independent portions of a hypertext markup language (HTML) document.

24. The computing device of claim 22, wherein the processor is configured with processor-executable instructions such that identifying independent portions of a web document comprises identifying independent portions of the web document that do not share state information.

25. The computing device of claim 22, wherein the processor is configured with processor-executable instructions such that identifying independent portions of a web document is accomplished by an external tool.

26. The computing device of claim 22, wherein the computing device is a web server.

27. The computing device of claim 22, wherein the processor is configured with processor-executable instructions such that associating the first tag with the first file comprises associating an iframe tag that includes both the sandbox attribute and the seamless attribute with the first file.

28. A computing device, comprising:
a transceiver configured to send and receive communication signals;
a memory; and
a processor coupled to the transceiver and the memory, wherein the processor is configured with processor-executable instructions to perform operations comprising:
receiving a web document in a browser application executing in the computing device, the web document including a plurality of files, a first tag, and a second tag, wherein a first file of the plurality of files includes all independent portions of the web document and a second file of the plurality of files includes all dependent portions of the web document, and wherein the first tag is associated with the first file and the second tag is associated with the second file;
determining that the first tag within the web document and the second tag within the web document each includes both a sandbox attribute and a seamless attribute, wherein the sandbox attribute and the seamless attribute are ordered in each tag of the first tag and the second tag to indicate whether the tag is associated with the first file containing the independent portions or the second file containing the dependent portions; and
processing the plurality of files in response to the determination.

29. The computing device of claim 28, wherein the processor is configured with processor-executable instructions to perform operations further comprising:
determining that the sandbox attribute is included in the first tag before the seamless attribute in response to determining that the first tag includes both the sandbox attribute and the seamless attribute; and
processing the independent portions of the first file in parallel when the sandbox attribute is included before the seamless attribute in the first tag.

30. The computing device of claim 28, wherein the processor is configured with processor-executable instructions to perform operations further comprising:
determining that the seamless attribute is included in the second tag before the sandbox attribute in response to determining that the second tag includes both the sandbox and seamless attributes; and
processing the dependent portions of the second file sequentially when the seamless attribute is included before the sandbox attribute in the second tag.

31. The computing device of claim 28, wherein the processor is configured with processor-executable instructions such that determining that the first tag within the web document includes both the sandbox attribute and the seamless attribute comprises determining that an iframe tag includes both the sandbox attribute and the seamless attribute.

32. The computing device of claim 28, wherein the processor is configured with processor-executable instructions to perform operations further comprising identifying independent portions of the web document before runtime.

33. A non-transitory computer readable storage medium having stored thereon processor-executable software instructions configured to cause a processor to perform operations comprising:
identifying independent portions and dependent portions of a web document;
partitioning the web document into a plurality of files, each of the identified independent portions being included in a first file of the plurality of files and each of the identified dependent portions being included in a second file of the plurality of files;
associating a first tag with the first file, the first tag including both a sandbox attribute and a seamless attribute;
associating a second tag with the second file, the second tag including both the sandbox attribute and the seamless attribute, wherein the sandbox attribute and the seamless attribute are ordered in each tag of the first tag and the second tag to indicate whether the tag is associated with the first file containing the independent portions or the second file containing the dependent portions;

inserting the plurality of files and the associated tags into the web document; and sending the web document to a browser application executing in a computing device.

34. The non-transitory computer readable storage medium of claim 33, wherein the stored processor-executable software instructions are configured to cause a processor to perform operations such that identifying independent portions of a web document comprises identifying independent portions of a hypertext markup language (HTML) document.

35. The non-transitory computer readable storage medium of claim 33, wherein the stored processor-executable software instructions are configured to cause a processor to perform operations such that identifying independent portions of a web document comprises identifying independent portions of the web document that do not share state information.

36. The non-transitory computer readable storage medium of claim 33, wherein the stored processor-executable software instructions are configured to cause a processor to perform operations such that identifying independent portions of a web document is accomplished by an external tool.

37. The non-transitory computer readable storage medium of claim 33, wherein the stored processor-executable software instructions are configured to be executed on a web server.

38. The non-transitory computer readable storage medium of claim 11, wherein the stored processor-executable software instructions are configured to cause a processor to perform operations such that associating the first tag with the first file comprises associating an iframe tag that includes both the sandbox attribute and the seamless attribute with the first file.

39. A non-transitory computer readable storage medium having stored thereon processor-executable software instructions configured to cause a processor to perform operations comprising:

receiving a web document in a browser application, the web document including a plurality of files, a first tag, and a second tag, wherein a first file of the plurality of files includes all independent portions of the web document and a second file of the plurality of files includes all dependent portions of the web document, and wherein the first tag is associated with the first file and the second tag is associated with the second file;

determining that the tag within the web document and the second tag within the web document each includes both a sandbox attribute and a seamless attribute, wherein the sandbox attribute and the seamless attribute are ordered in each tag of the first tag and the second tag to indicate whether the tag is associated with the first file containing the independent portions or the second file containing the dependent portions; and processing the plurality of files associated in response to the determination.

40. The non-transitory computer readable storage medium of claim 39, wherein the stored processor-executable software instructions are configured to cause a processor to perform operations comprising:

determining that the sandbox attribute is included in the first tag before the seamless attribute in response to determining that the first tag includes both the sandbox attribute and the seamless attribute; and processing the independent portions of the first file in parallel when the sandbox attribute is included before the seamless attribute in the first tag.

41. The non-transitory computer readable storage medium of claim 39, wherein the stored processor-executable software instructions are configured to cause a processor to perform operations comprising:

determining that the seamless attribute is included in the second tag before the sandbox attribute in response to determining that the second tag includes both the sandbox attribute and the seamless attribute; and processing the dependent portions of the second file sequentially when the seamless attribute is included before the sandbox attribute in the second tag.

42. The non-transitory computer readable storage medium of claim 39, wherein the stored processor-executable software instructions are configured to cause a processor to perform operations such that determining that the first tag within the web document includes both the sandbox attribute and the seamless attribute comprises determining that an iframe tag that includes both the sandbox attribute and the seamless attribute.

43. The non-transitory computer readable storage medium of claim 39, wherein the stored processor-executable software instructions are configured to cause a processor to perform operations further comprising identifying independent portions of the web document before runtime.

44. A system, comprising:

a server comprising a server transceiver configured to send and receive communication signals, a server memory, and a server processor coupled to the server transceiver and the server memory; and a computing device comprising a device transceiver configured to send and receive communication signals, a device memory, and a device processor coupled to the server transceiver and the server memory, wherein the server processor is configured with server-executable instructions to perform operations comprising:

identifying independent portions and dependent portions of a web document;

partitioning the web document into a plurality of files, each of the identified independent portions being included in a first file of the plurality of files and each of the identified dependent portions being included in a second file of the plurality of files;

associating a first tag with the first, the first tag including both a sandbox attribute and a seamless attribute;

associating a second tag with the second file, the second tag including both the sandbox attribute and the seamless attribute, wherein the sandbox attribute and the seamless attribute are ordered in each tag of the first tag and the second tag to indicate whether the tag is associated with the first file containing the independent portions or the second file containing the dependent portions;

inserting the plurality of files and the associated tags into the web document; and sending the web document to a browser application executing in a computing device.

45. The system of claim 44, wherein the server processor is configured with server-executable instructions such that identifying independent portions of a web document comprises identifying independent portions of a hypertext markup language (HTML) document.

46. The system of claim 44, wherein the server processor is configured with server-executable instructions such that identifying independent portions of a web document comprises identifying independent portions of the web document that do not share state information.

47. The system of claim 44, wherein the server processor is configured with server-executable instructions such that identifying independent portions of a web document is accomplished by an external tool.

48. The system of claim 44, wherein the device processor is configured with processor-executable instructions to perform operations comprising:
- receiving the web document in the browser application executing in the computing device;
- determining that the first tag within the web document includes both the sandbox attribute and the seamless attribute; and
- processing the first file associated with the first tag in response to determining that the first tag includes both the sandbox attribute and the seamless attribute.

49. The system of claim 48, wherein the processor is configured with processor-executable instructions such that determining that the first tag within the web document includes both the sandbox attribute and the seamless attribute comprises determining that an iframe tag includes both the sandbox attribute and the seamless attribute.

50. The system of claim 48, wherein the processor is configured with processor-executable instructions further comprising identifying independent portions of the web document in the browser application before runtime.

51. The system of claim 44, wherein the device processor is configured with processor-executable instructions to perform operations further comprising:
- determining that the sandbox attribute is included in the first tag before the seamless attribute; and
- processing the independent portions of the first file in parallel when the sandbox attribute is included before the seamless attribute in the first tag.

52. The system of claim 44, wherein the processor is configured with processor-executable instructions to perform operations further comprising:
- determining that the seamless attribute is included in the second tag before the sandbox attribute; and
- processing the dependent portions of the second file sequentially when the seamless attribute is included before the sandbox attribute in the second tag.

* * * * *